(12) United States Patent
Voss et al.

(10) Patent No.: US 11,106,495 B2
(45) Date of Patent: Aug. 31, 2021

(54) TECHNIQUES TO DYNAMICALLY PARTITION TASKS

(71) Applicant: Intel Corporation, Santa Clara, CA (US)

(72) Inventors: Michael Voss, Austin, TX (US); Pablo Reble, Austin, TX (US); Aleksei Fedotov, Nizhny Novgorod (RU)

(73) Assignee: INTEL CORPORATION, Santa Clara, CA (US)

( * ) Notice: Subject to any disclaimer, the term of this patent is extended or adjusted under 35 U.S.C. 154(b) by 140 days.

(21) Appl. No.: 16/440,024

(22) Filed: Jun. 13, 2019

(65) Prior Publication Data

US 2019/0294469 A1 Sep. 26, 2019

(51) Int. Cl.
*G06F 9/48* (2006.01)
(52) U.S. Cl.
CPC .................................. *G06F 9/4881* (2013.01)
(58) Field of Classification Search
CPC .................. G06F 9/4881; G06F 2209/5017
See application file for complete search history.

(56) References Cited

U.S. PATENT DOCUMENTS

| 2013/0227582 A1* | 8/2013 | Daly | G06F 9/4881 718/103 |
| 2014/0109102 A1* | 4/2014 | Duncan | G06F 9/4881 718/103 |
| 2015/0363239 A1* | 12/2015 | Hsu | G06F 9/5044 718/104 |

* cited by examiner

*Primary Examiner* — Dong U Kim
(74) *Attorney, Agent, or Firm* — Kacvinsky Daisak Bluni PLLC

(57) ABSTRACT

Various embodiments are generally directed to techniques for partitioning parallelizable tasks into subtasks for processing. Some embodiments are particularly directed to dynamically determining chunk sizes to use in partitioning tasks, such as parallel loops or divide and conquer algorithm tasks, into subtasks based on the probability of a priority task source introducing a high-priority task. For example, a measurement signal received from a probe indicating an operational characteristic associated with a priority task source may be used to generate an estimate of the probability of a priority task source introducing a high-priority task. In such examples, the estimate may be used to determine a chunk size for a parallelizable task and the parallelizable task may be partitioned into a plurality of subtasks based on the chunk size and the subtasks may be assigned, for execution, to at least one task queue in a task pool.

19 Claims, 11 Drawing Sheets

100

200

300

*400A*

400B

400C

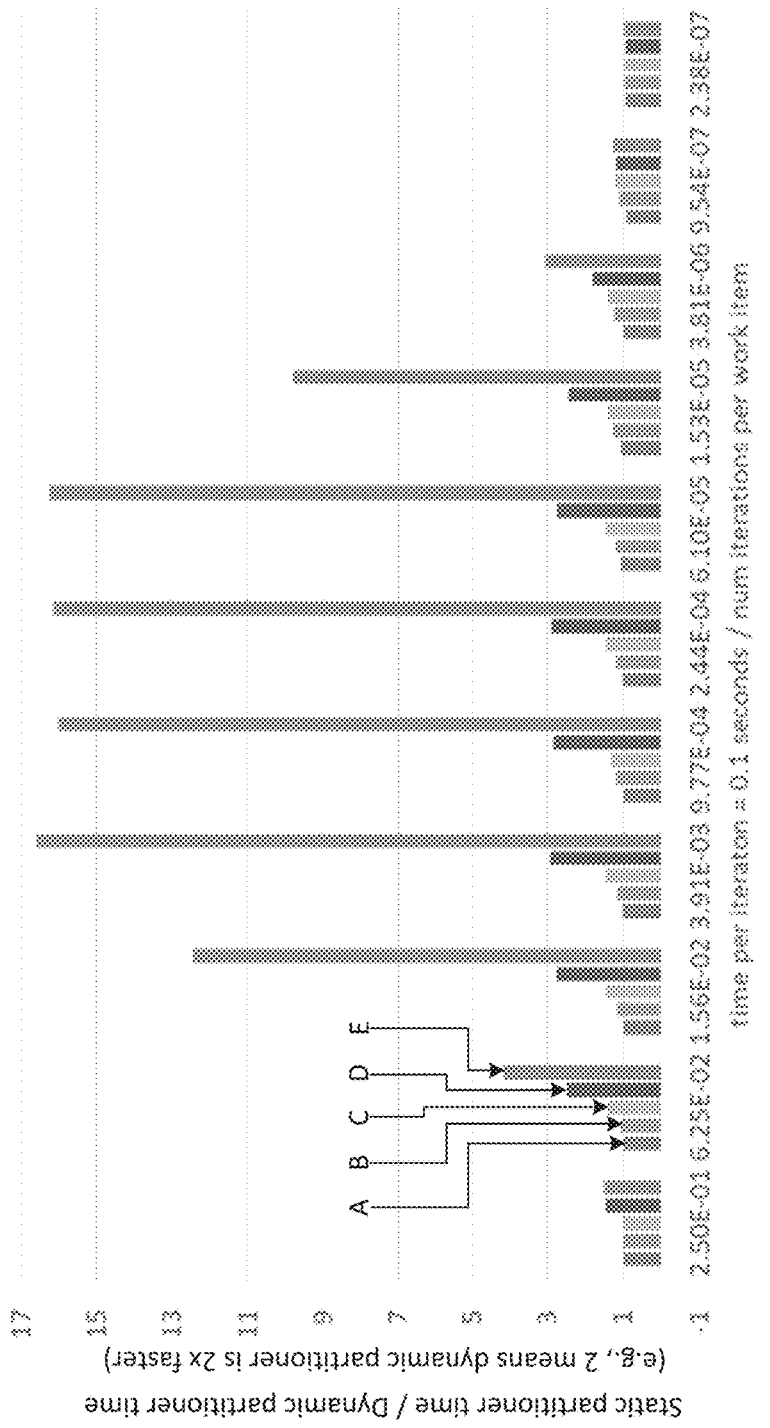

*FIG. 7*

Storage Medium 700

*Computer Executable Instructions for 600*

TECHNIQUES TO DYNAMICALLY PARTITION TASKS

BACKGROUND

Generally, parallel computing refers to a type of computation in which many calculations or the execution of processes are carried out simultaneously. For example, large operations may be divided into a number of smaller operations that may be performed simultaneously. Parallel computing includes a variety of types of parallelism, such as bit-level parallelism, instruction-level parallelism, and task parallelism. Task parallelism may include the decomposition of a task into sub-tasks, and then allocating each sub-task to a processor for execution. For instance, a loop may be divided into tasks each of which executes a sub-range of the available loop iterations. Sometimes, the sub-tasks may be further partitioned before allocation to a processor for execution. In either case, a plurality of processors may then execute the divided portions of the task concurrently.

BRIEF DESCRIPTION OF THE DRAWINGS

FIG. 5 illustrates exemplary aspects of dynamically partitioning tasks according to one or more embodiments described here.

FIG. 7 illustrates an embodiment of a storage medium according to one or more embodiments described herein.

DETAILED DESCRIPTION

Figure 1:
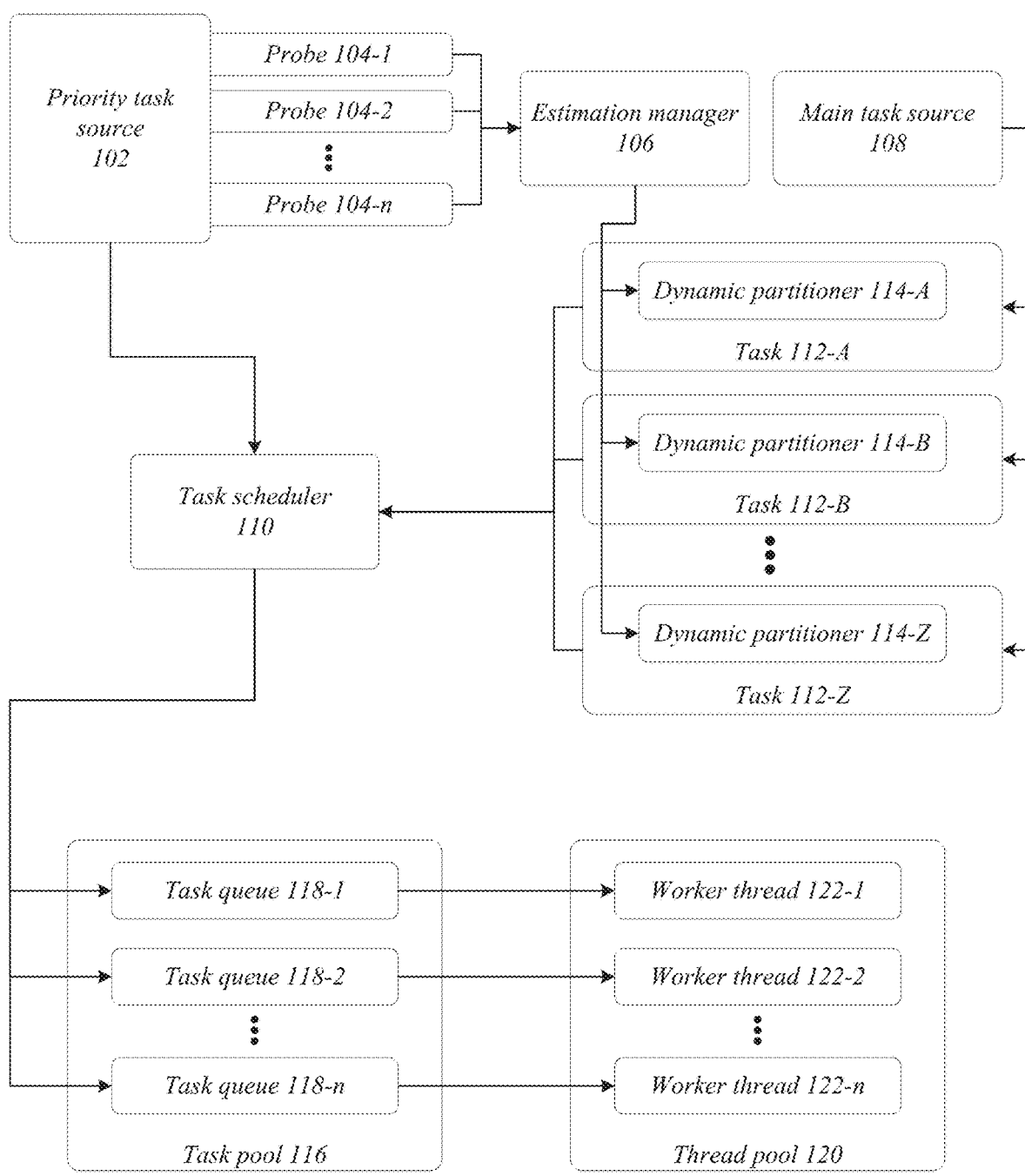
FIG. 1 illustrates an exemplary operating environment for dynamic partitioning of tasks according to one or more embodiments described herein.

Various embodiments are generally directed to techniques for partitioning parallelizable tasks into subtasks for processing. Some embodiments are particularly directed to dynamically determining chunk sizes to use in partitioning tasks, such as parallel loops or divide and conquer algorithm tasks, into subtasks based on the probability of a priority task source introducing a high-priority task. In one embodiment, for example, an apparatus may comprise a processor and memory comprising instructions that when executed by the processor cause the processor to perform one or more of the following techniques to assess the probability of high-priority tasks being created and/or dynamically partition tasks for parallel processing based on the probability of high-priority tasks being created. In some embodiments, the processor may identify a measurement signal received from a probe. In some such embodiments, the measurement signal may indicate an operational characteristic associated with a priority task source. In various embodiments, the processor may generate an estimate based on the measurement signal received from the probe. In various such embodiments, the estimate may indicate a probability of the priority task source generating a high-priority task. In many embodiments, the processor may determine a chunk size for a parallelizable task based on the estimate. In some embodiments, the processor may partition the parallelizable task into a plurality of subtasks based on the chunk size. In several embodiments, the processor may assign, for execution, one or more of the plurality of subtasks to at least one task queue in a task pool.

Some challenges facing parallel processing include providing predictable and responsive service to high-priority tasks. For instance, a task may have to be processed to completion by a worker thread before another task can be scheduled onto the worker thread. Further, low-priority tasks that require a plurality of iterations may be split into a number of subtasks for parallel processing by the worker threads. Accordingly, a high-priority task may be delayed until one of the low-priority tasks completes and a worker thread becomes available. The present disclosure provides for dynamically partitioning tasks based on a probability of priority tasks being introduced, which may reduce the probability that processing of priority tasks is delayed.

Adding further complexity, many task partitioning strategies including parallel loop partitioning strategies seek to maximize subtask size, making the system even less reactive to high-priority tasks. This can result from task partitioning strategies excessively trying to improve performance of the task itself. Large chunk sizes may provide the best performance in balanced workloads, but do not allow worker threads to react quickly to the appearance of work with higher priority. On the other hand, small chunk sizes may allow worker threads to react quickly to the appearance of high-priority and/or asynchronous communication work but incur larger scheduling overheads. In the absence of work with a higher priority, using chunk sizes that are smaller than needed for effective load balancing results in unnecessary performance loss. These and other factors may result in parallel processing with excessive overhead, limited applicability, and poor adaptability. Such limitations can drastically reduce the usability and performance of parallel processing, contributing to inefficient systems, devices, and techniques.

Many user-level tasking libraries use non-preemptive schedulers that schedule tasks, or subtasks, on to a pool of worker threads. Typically, the thread pools contain one software thread per logical core. These schedulers may be called non-preemptive because each task, or subtask, must be executed to completion by its assigned worker thread before any other task, or subtask, can be executed by that thread. Often, the user-level tasking libraries execute a task, such as a loop, by creating subtasks that are scheduled on to the worker threads. For examples, the following loop:

$$\text{for (int } i=0; i<N; ++i) f(a[i]);$$

may be expressed as a parallel loop in the Intel® Threading Building Blocks (TBB) library as:

```
tbb::parallel_for(0, N, [&] (int i) {
    f(a[i]);
});
```

The TBB library may execute the loop by creating subtasks that are scheduled onto worker threads. Each subtask applies the body (e.g., the C++ lambda expression in the snippet above) to a chunk of iterations from the range. If all of the iterations in a parallel loop have equal work, the best range partitioning strategy is to create one chunk of iterations per worker thread, where N is the number of iterations and P is the number of threads. Resulting in roughly N/P iterations per worker thread. These large chunks minimize scheduling overheads, without creating a load imbalance. If, however, the work per iteration varies, then it is better to create many more tasks than worker threads, with each task executing a very small chunk of the range at a time. Using smaller chunks gives more flexibility to the scheduler to balance the work performed by each worker thread—sending fewer tasks to threads that must execute that more time-consuming iterations. When considering only execution on a system with CPU cores, best performance is typically obtained by creating the largest tasks that allow for good load balancing.

Various embodiments described herein include the ability to dynamically partition tasks based on a probability of priority tasks being introduced. Many embodiments include a dynamic range partitioner that uses a loop-optimal partitioning strategy (e.g., using large chunks) when the probability of high-priority tasks being introduced is small and a reactive partitioning strategy (e.g., using smaller chunks) during program phases when the introduction of high-priority tasks is likely. This can enable embodiments to be reactive to high-priority tasks while minimizing overhead associated with being reactive. Such phases can commonly occur in applications that offload work to hardware accelerators. Accordingly, when work is only being processed on the host, loops can be partitioned optimally for the host; however, when both the host and an accelerator are used simultaneously, the host can react to high-priority results that return from the accelerator asynchronously. This can result in improved performance by reducing the time the accelerator has to wait before a host thread can service it.

In several embodiments, the probability of high-priority tasks being introduced may be estimated based on probe measurements. In several such embodiments, the estimated probability of high-priority tasks being introduced may be used by the dynamic range partitioner to select an optimal partitioning strategy. In these and other ways, components described here may identify methods to increase efficiency, decrease performance costs, decrease computational cost, and/or reduce resource requirements to implement parallel processing, in an accurate, reactive, efficient, dynamic, and scalable manner, resulting in several technical effects and advantages over conventional computer technology, including increased capabilities and improved adaptability. In various embodiments, one or more of the aspects, techniques, and/or components described herein may be implemented in a practical application via one or more computing devices, and thereby provide additional and useful functionality to the one or more computing devices, resulting in more capable, better functioning, and improved computing devices. Further, one or more of the aspects, techniques, and/or components described herein may be utilized to improve the technical field of parallel processing and/or accelerator integration.

In several embodiments, components described herein may provide specific and particular manners of automatically adjusting partitioning strategies to optimize performance and/or responsiveness. In several such embodiments, the specific and particular manners of automatically adjusting partitioning strategies may include estimating a probability of high-priority tasks being introduced based on one or more probe measurements. In many embodiments, one or more of the components described herein may be implemented as a set of rules that improve computer-related technology by allowing a function not previously performable by a computer that enables an improved technological result to be achieved. For example, the function allowed may include automatically adjusting partitioning strategies based on a probability of high-priority tasks being introduced.

With general reference to notations and nomenclature used herein, one or more portions of the detailed description, which follows, may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatuses may be specially constructed for the required purpose or may include a general-purpose computer. The required structure for a variety of these machines will be apparent from the description given.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well-known structures and devices are shown in block diagram form to facilitate a description thereof. The intention is to cover all modification, equivalents, and alternatives within the scope of the claims.

FIG. 1 illustrates an exemplary operating environment 100 for dynamic partitioning of parallelizable tasks (or tasks) according to one or more embodiments described herein. Operating environment 100 may include a priority task source 102, one or more probes 104-1, 104-2, 104-n (or probes 104), an estimation manager 106, a main task source 108, a task scheduler 110, one or more tasks 112-A, 112-B, 112-Z (or tasks 112), a task pool, and a thread pool 120. In many embodiments, estimation manager 106 may determine a probability of the priority task source 102 generating a high-priority task based on measurement signals received from one or more of the probes 104. In many such embodiments, the measurement signals may indicate an operational characteristic associated with the priority task source 102. In several embodiments, the probability of the priority task source 102 generating a high-priority task is utilized to partition the one or more tasks 112. Embodiments are not limited in this context.

More generally, in one or more embodiments, tasks may be provided by either the priority task source 102 or the main task source 108 for the performance of an operation by thread pool 120. In some embodiments, tasks and/or subtasks are provided to task scheduler 110 for scheduling. To schedule a task, the task scheduler 110 may assign the task to one of a plurality of task queues 118-1, 118-2, 118-$n$ (or task queues 118) in task pool 116. In several embodiments, the task scheduler 110 may be a non-preemptive task scheduler. Once a task is assigned to one of task queues 118 it will be performed, in turn, by an associated one of a plurality of worker threads 122-1, 122-2, 122-$n$ (or worker threads 122) in thread pool 120. In many embodiments, tasks 112 from the main task source 108 may be broken into a number of subtasks that may be processed in parallel by two or more of worker threads 122 in the thread pool 120. For example, a task that represents a parallel loop may be broken into subtasks that each execute a chunk of the original iteration space. In several embodiments, to limit processing of tasks from blocking or delaying processing of a high-priority task from the priority task source 102, one or more of the dynamic range partitioners 114 may adjust partitioning size, or chunk size, to enable quicker processing of high-priority tasks from priority task source 102.

In the illustrated embodiment, each of the one or more tasks 112 include a dynamic range partitioner 114-A, 114-B, 114-Z (or dynamic range partitioners 114). In such embodiments, each of the dynamic range partitioners may be responsible for partitioning their respective tasks and providing the partitioned tasks (i.e., subtasks) to the task scheduler 110. In other embodiments, a dynamic range partitioner may determine partitioning and provide partitioned tasks to the task scheduler 110 for a plurality of tasks. In either case, task scheduler 110 may then assign the partitioned tasks to one or more of the task queues 118 in task pool 116 for execution by a corresponding one of the worker threads 122 in thread pool 120. It will be appreciated that a correspondence may or may not exist between the number of one or more of probes 104, tasks 112, dynamic range partitioners 114, task queues 118, and worker threads 122. Instead, in various embodiments, the number of one or more components described herein may be adjusted as needed without departing from the scope of this disclosure. For instance, a single probe may be utilized in conjunction with priority task source 102. In another instance, multiple worker threads may utilize a single task queue.

Many embodiments described herein may include a software system that improves overall application performance for applications that use non-pre-emptive schedulers to execute both tasks from main task source 108 and to execute high-priority tasks from priority task source 102 that might appear during execution of tasks from main task source 108. In many embodiments, tasks from main task source 108 may include parallelizable tasks, such as parallel loops and/or divide and conquer algorithm tasks. Several embodiments utilize a loop-optimal partitioning strategy when the probability of high-priority tasks being introduced is small and a responsive partitioning strategy during program phases when the introduction of high-priority tasks is likely (e.g., in case of concurrent offload of work to an accelerator). Advantageous embodiments described herein may include one or more of the following three components: (1) one or more probes 104 that measure system and/or software state; (2) an estimation manager 106 that determines how likely the introduction of high-priority tasks is based on measurements made by the probes; and (3) one or more dynamic range partitioners 114 that implements a partitioning strategy in response to the probability of high-priority task injection.

In various embodiments, the priority task source 102 may include an accelerator, such as a hardware accelerator. In some embodiments, the accelerator may include one or more of a graphics processing unit (GPU), a hardware accelerator, a field programmable gate array (FPGA), a machine learning accelerator, an encryption accelerator, and the like. In one or more embodiments, the priority task source 102 may be designated, such as based on user input. In one or more such embodiments, the priority task source may be designated as a subset of a set of processing cores.

Figure 2:
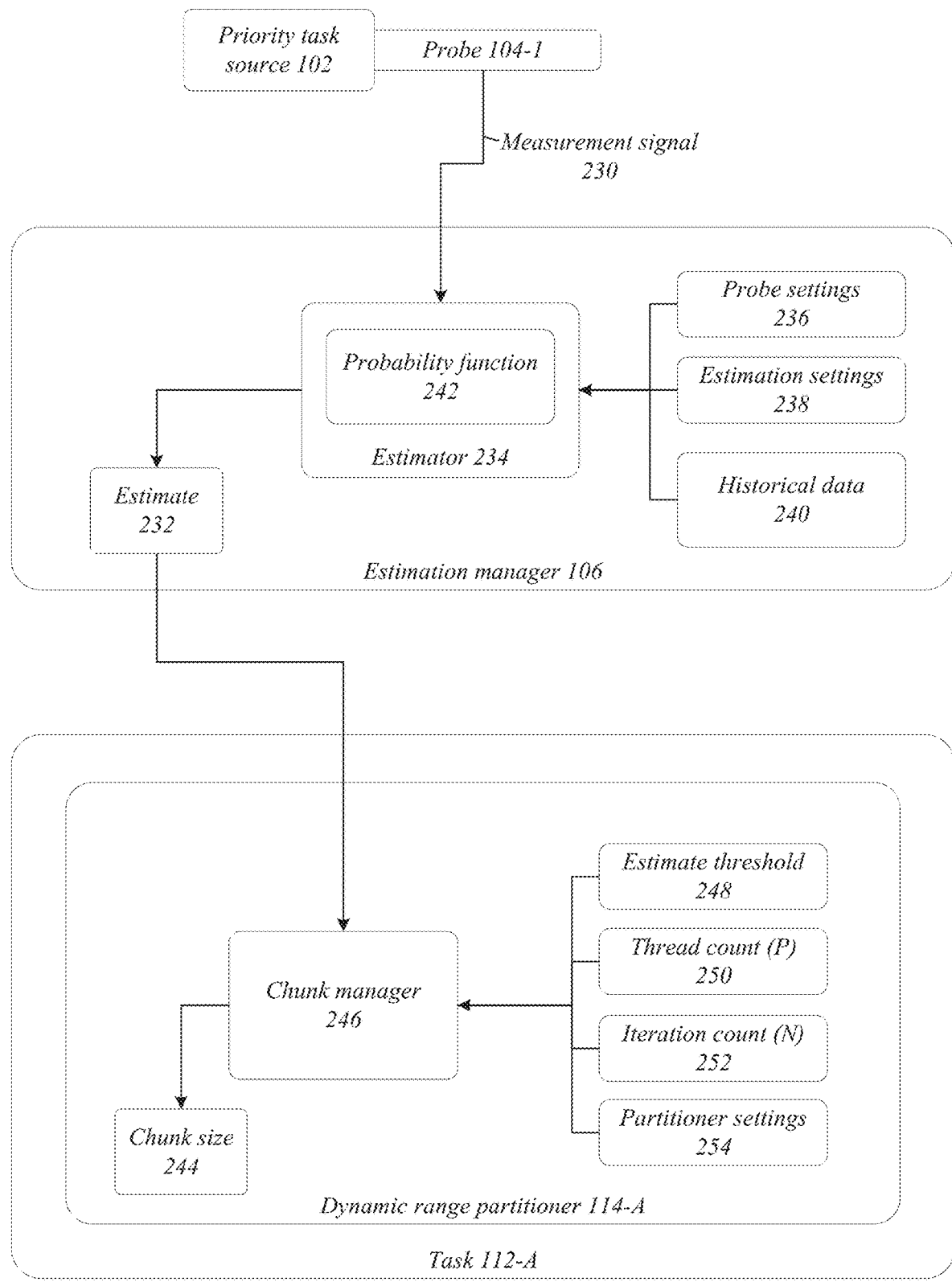
FIG. 2 illustrates exemplary aspects of a process flow for dynamic partitioning of tasks according to one or more embodiments described herein.

FIG. 2 illustrates exemplary aspects of a process flow 200 for dynamic partitioning of tasks according to one or more embodiments described herein. Process flow 200 may include priority task source 102, probe 104-1, estimation manager 106, task 112-A, and dynamic range partitioner 114-A. In one or more embodiments described herein, estimation manager 106 may generate estimate 232 based on measurement signal 230. In one or more such embodiments, dynamic range partitioner 114-A may utilize the estimate 232 to determine a chunk size 244 for partitioning tasks, such as parallel loops or divide and conquer algorithm tasks. In the illustrated embodiment, estimation manager 106 may include estimate 232, estimator 234 with probability function 242, probe settings 236, estimation settings 238, and historical data 240. Further, dynamic range partitioner 114-A may include chunk size 244, chunk manager 246, estimate threshold 248, thread count (P) 250, iteration count (N) 252, and partitioner settings 254. It will be appreciated that any operations, techniques, and/or components described with respect to one or more components in process flow 200 may be utilized in conjunction with other components described here. For instance, probe 104-1 may be replaced with one or more other probes and/or dynamic range partitioner 114-A may be replaced with one or more other dynamic range partitioners. Embodiments are not limited in this context.

In various embodiments, estimator 234 may utilize one or more of probability function 242, probe settings 236, estimation settings 238, and historical data 240 to generate estimate 232 based on measurement signal 230. In many embodiments, estimate 232 may indicate a probability of high-priority tasks being introduced by priority task source 102. In several embodiments, the estimate 232 may be passed to chunk manager 246 of dynamic range partitioner 114-A. In one or more embodiments, chunk manager 246 may utilize one or more of estimate threshold 248, thread count (P) 250, iteration count (N) 252, and partitioner settings 254 to determine the chunk size 244. In some embodiments, chunk manager 246 may utilize one or more of estimate threshold 248, thread count (P) 250, iteration count (N) 252, and partitioner settings 254 to determine a partitioning strategy, and the partitioning strategy may be utilized by the chunk manager 246 to determine the chunk size 244. In one or more such embodiments, the chunk size 244 may indicate the size of tasks that are provided to the task scheduler by the dynamic range partitioner 114-A.

In the illustrated embodiment, estimator 234 may receive measurement signal 230 from probe 104-1. In some embodiments, estimator 234 may receive measurement signals from a plurality of probes. In many embodiments, estimator 234 may utilize one or more of probe settings 236, estimation settings 238, and historical data 240 to generate probability function 242. For instance, historical data 240 may be used in conjunction with machine learning to determine the probability function 242. In various embodiments, the probability function 242 may be applied to the measurement signal 230 to determine the estimate 232.

In many embodiments, the measurement signal 230 may indicate an operational characteristic associated with the priority task source. For example, the operational characteristics may indicate one or more of a software state or a device state. In some embodiments, the software state may include one or more of a queue state in a driver for the priority task source, an indication that results are pending from a computation that has been offloaded to the priority task source, a flag, a state bit, a register value, and the like. In various embodiments, the device state may include one or more of a power consumption, a power state, an idle state, a temperature, a frequency, and the like.

In several embodiments, probe settings 236 may indicate one or more characteristics of probe 104-1 and/or the priority task source 102 monitored by probe 104-1. For example, probe settings 236 may indicate a probe type, a priority task source type, or a data rate or communication scheme of the probe. In some embodiments, the probe settings 236 may indicate probe metrics, such as what the probe is measuring. In various embodiments, estimation settings 238 may include one or more settings associated with generation of the estimate 232 and/or the probability function 242. For instance, estimation settings 238 may cause estimator 234 to generate conservative estimates (e.g., by rounding down). In another instance, estimation settings 238 may cause the probability function to give more weight in determining estimate 232 to measurement signals from certain probes or measurement signals indicating certain characteristics.

In various embodiments, the estimate 232 may be provided to dynamic range partitioner 114-A for the determination of chunk size 244. In many embodiments, the dynamic range partitioner 114-A may periodically receive estimates from estimation manager 106. In some embodiments, estimates may be provided by estimation manager 106 on demand from dynamic range partitioner 114-A. In one or more embodiments, estimates may be provided by estimation manager 106 in response to some indication of probability of a high-priority task being introduced. In one or more such embodiments, chunk manager 246 may assume a low probability of a high-priority task being introduced in the absence of an estimate from estimation manager 106.

In several embodiments, chunk manager 246 may utilize one or more of estimate threshold 248, thread count 250, iteration count 252, and partitioner settings 254 to determine the chunk size 244 based on estimate 232. For example, chunk manager 246 may select a first chunk size if the estimate 232 is below the estimate threshold 248 and a second chunk size if the estimate 232 is above the estimate threshold 248. In such examples, the first chunk size may be iteration count 252 divided by thread count 250. In some embodiments, thread count 250 may equal the number of worker threads 122 in thread pool 120 while the iteration count 252 may equal the number of times a loop is performed, such as in a for loop or while loop. In various embodiments, the partitioner settings 254 may include one or more settings associated with determining the chunk size 244. In various such embodiments, the partitioner settings 254 may indicate which partitioning strategy to use based on the estimate 232. For example, partitioner settings 254 may indicate that the chunk size 244 should be N/P when the estimate 232 is below the estimate threshold 248. This example will be expanded on with respect to FIG. 3.

Figure 3:
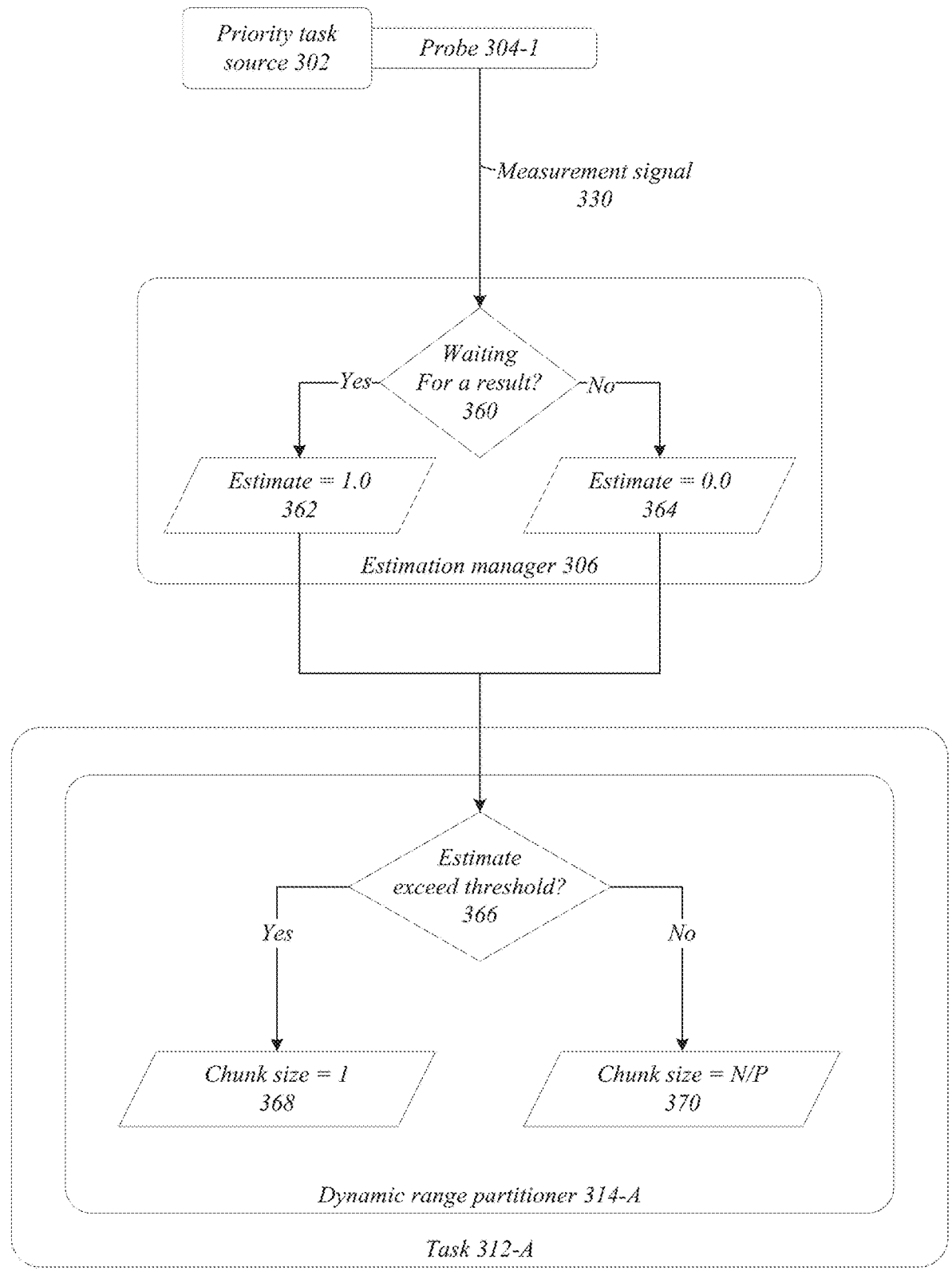
FIG. 3 illustrates an exemplary process flow to dynamically partition tasks according to one or more embodiments described herein.

FIG. 3 illustrates an exemplary process flow 300 to dynamically partition subtasks according to one or more embodiments described herein. Process flow 300 may include priority task source 302, probe 304-1, measurement signal 330, estimation manager 306, task 312-A, and dynamic range partitioner 314-A. One or more components of process flow 300 may be the same or similar to one or more other components described herein. For instance, priority task source 302 may be the same as priority task source 102, estimation manager 306 may be the same as estimation manager 106, task 312-A may be the same as task 112-A, and dynamic range partitioner 314-A may be the same as dynamic range partitioner 114-A. Process flow 300 may include an example embodiment according to one or more techniques described herein. Further, the example embodiment may be for a system that uses a host with multiple threads and a priority task source 302 comprising a hardware accelerator that includes a graphics processing unit (GPU). Embodiments are not limited in this context.

In process flow 300, the probe 304-1 may monitor whether a runtime library in a runtime has offloaded a computation from the host to a GPU (i.e., priority task source 302) and is waiting for a result. Accordingly, the estimation manager 306 may receive measurement signal 330 and determine at block 360 whether the runtime is waiting for a result. If the system is waiting for a result, the estimation manager 306 generates an estimate of 1.0 at block 362. However, if the system is not waiting for a result, the estimation manager 306 generates an estimate of 0.0 at block 364. In some embodiments, features and/or techniques described herein may be included in a runtime library. In some such embodiments, the features and/or techniques described herein and included in the runtime library may be optional features that may be selectively activated or deactivated.

In process flow 300 it may be assumed that the application has a single parallel loop and a single dynamic range partitioner. Each time the loop executes, it looks at the current estimate and chooses a chunk size of 1 if the probability is greater than 0.5, resulting in a maximally responsive system, or else it chooses a chunk size of N/P, which is optimally performant for the host. Accordingly, at block 366, if the estimate exceeds the threshold (i.e., 0.5) a chunk size of 1 is determined at block 368. However, at block 366, if the estimate is below the threshold a chunk size of N/P is determined at block 370.

In other embodiments, other probe metrics may be utilized. For example, the probe metrics may include one or more of power consumption of accelerators, queue lengths in accelerator drivers, or the like. In some embodiments, as previously mentioned, some estimators may make use of historical data. In some such embodiments, the historical data may be used to generate a probability function that indicates probability over time. For example, it may be less likely that a high-priority task will be injected immediately after work is offloaded to an accelerator, but the probability will ramp to 1.0 over some period of time. In various embodiments, dynamic range partitioners may use a wide variety of chunk sizes or may create smaller chunks for only a subset of threads so that they stay reactive, while other threads incur less overhead. Some of these alternatives are described in more detail with respect to FIGS. 4A-4C.

Figure 4A:
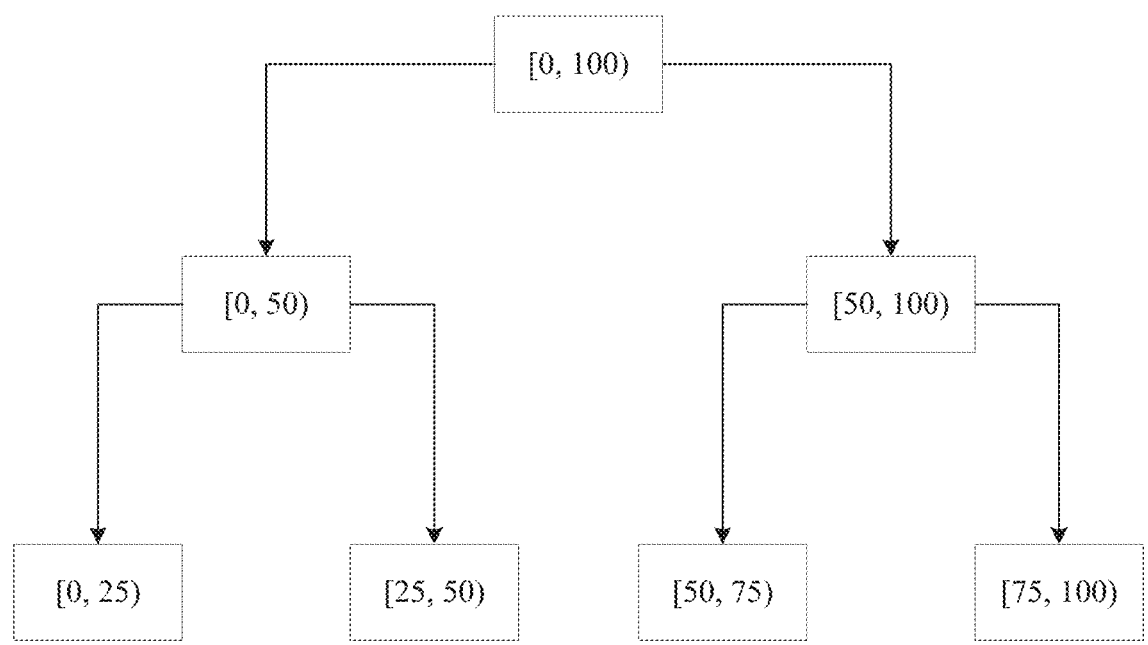
FIGS. 4A-4C illustrate exemplary techniques for partitioning tasks according to one or more embodiments described herein.
Figure 4B:
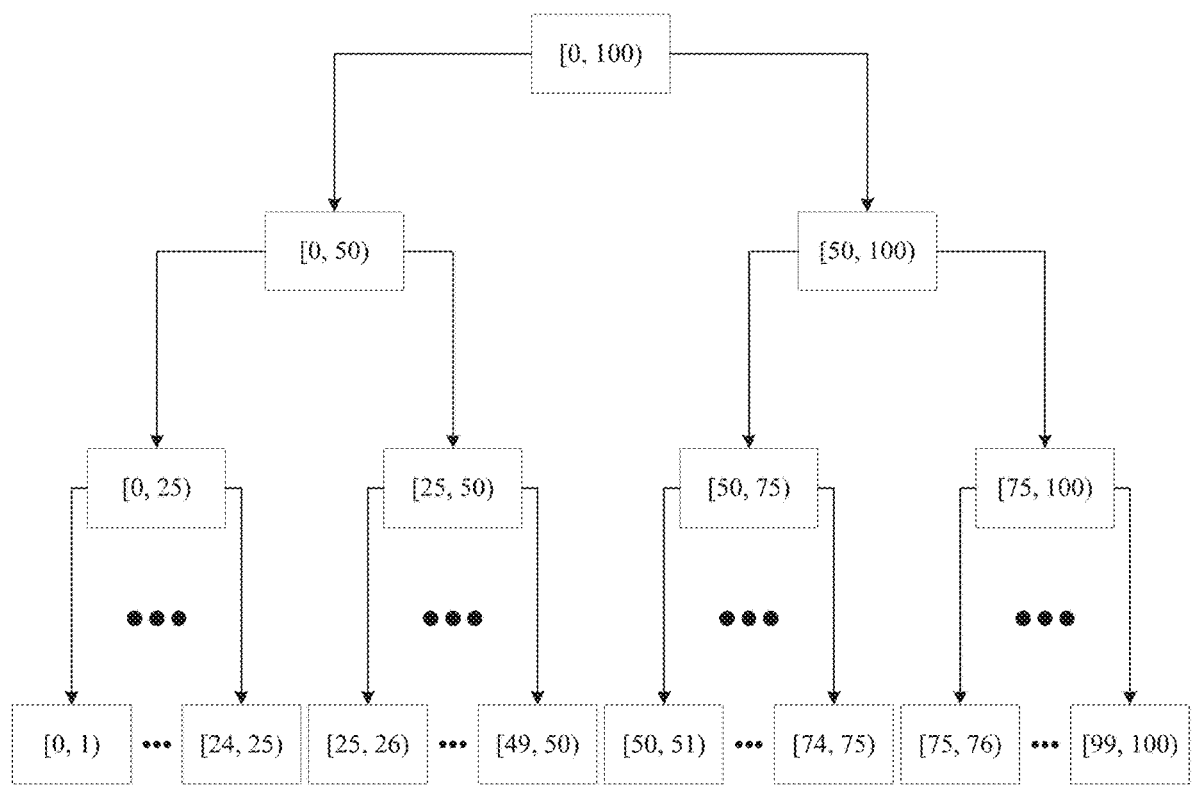
Figure 4C:
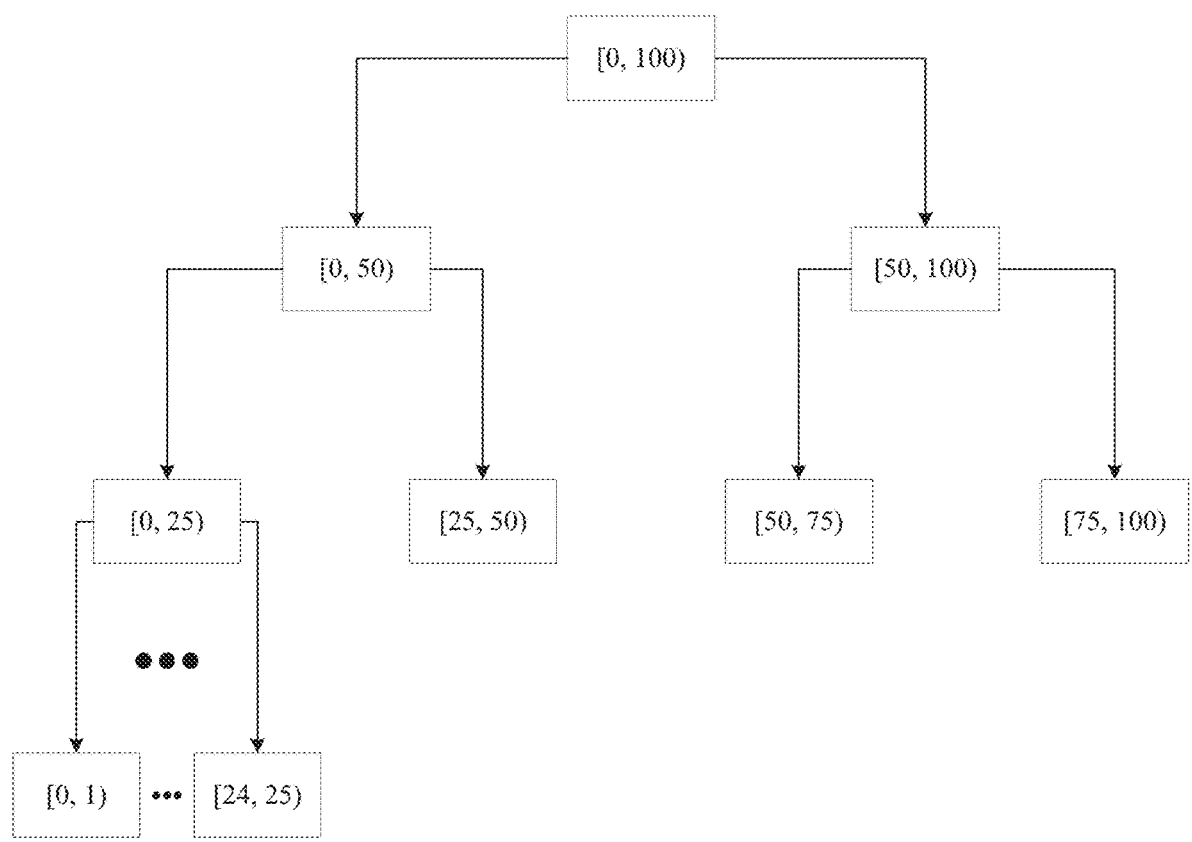

FIGS. 4A-4C illustrate exemplary techniques for partitioning tasks in environments 400A, 400B, and 400C according to one or more embodiments described herein. In some embodiments, environment 400A may illustrate a recursive range division of a task using one or more embodiments described herein when there is a low probability of a high-priority task. In various embodiments, environment 400B may illustrate a recursive range division of a task using one or more embodiments described herein when there is a high probability of a high-priority task. In many embodiments, environment 400C may illustrate range division of a task using one or more embodiments described herein when one dedicated thread is assigned to communicate with the accelerator while other threads divide work statically. One or more embodiments described herein may utilize and/or select from one or more of the techniques illustrated in FIGS. 4A-4C. In one or more such embodiments, the techniques may be automatically utilized and/or selected based on one or more estimates, measurement signals, thresholds, settings, historical data, and the like. Embodiments are not limited in this context.

Referring to FIG. 4A, environment 400A shows an example partitioning of a range [0, 100) for four threads when the estimator determines a low probability for a high-priority task. In this embodiment, when the estimator returns a probability of 0.0, the dynamic range partitioner uses a chunk size of N/P, or 100/4, which equals 25. Therefore, FIG. 4A includes four leaves in the tree and each leaf in this tree represents a subrange that will be executed as a subtask. In other words, the range of [0, 100) is divided into four subtasks with the first subtask including [0, 25), the second subtask including [25, 50), the third subtask including [50, 75), and the fourth subtask including [75, 100). Each of these subtasks are then scheduled for execution.

Referring to FIG. 4B, environment 400B shows an example partitioning of a range [0, 100) for four threads when the estimator determines a high probability for a high-priority task. In this embodiment, when the estimator returns a probability of 1.0, the dynamic range partitioner uses a chunk size of 1. Therefore, FIG. 4B includes 100 leaves in the tree and each leaf in this tree represents a subrange that will be executed as a subtask. In other words, the range of [0, 100) is divided into 100 subtasks with the first subtask including [0, 1), the second subtask including [1, 2), the third subtask including [2, 3), and so on with the $100^{th}$ subtask including [99, 100). Each of these subtasks is then scheduled for execution.

Referring to FIG. 4C, environment 400C shows a more adaptive scheme for work partitioning. The fine-grained work division of environment 400B may be excessive if communication with the priority task source is rare, such as when each thread incurs the additional scheduling overheads even though only one thread is needed to respond when asynchronous communication takes place. Accordingly, environment 400C illustrates a hybrid partitioning strategy that may be utilized. The hybrid partitioning strategy may create P-1 large leaves for P-1 of the worker thread, while smaller subtasks are created for one of the threads. In various embodiments, this may allow the thread with smaller subtasks to remain reactive to high-priority tasks.

In some embodiments described herein it is assumed that the chunk size is fixed at the time a loop starts executing. In other embodiments, the size of the subranges may be adjusted dynamically as the loop is executing. This may result in smaller or larger subtask size adjustments to be made even while the loop is being executed. A key differentiator in various embodiments described herein may include the selection of a partitioning scheme and/or chunk size based on a predicted probability that the task scheduler will need to quickly service high-priority tasks that arrive while a task is executing. However, a wide range of partitioning strategies may be selected from.

For instance, one of the partitioning strategies may include a dynamic scheduling approach that reacts to demand for work by further splitting a loop's range may be utilized. Accordingly, a demand flag may be used to detect when additional threads execute part of a loop's range. If there is no demand for work, the range is not split as finely. This approach may react to current system behavior, the demand for the work that is being generated by the loop being scheduled. In another example, a partitioning strategy that utilizes preemptive tasks that allow high-priority tasks to preempt lower-priority tasks may be used. In such examples, a software system in which run-to-completion tasks can be dynamically promoted to suspendable tasks may be used. Such a system may be used to mitigate higher cost of always using preemptive tasks by only promoting run-to-completion tasks to a suspendable mode when higher-priority tasks are predicted to enter the system.

FIG. 5 illustrates exemplary aspects of dynamically partitioning tasks comprising parallel loops according to one or more embodiments described herein. Environment 500 includes a chart 502 of the improvement from disclosed embodiments for the microbenchmark on a system using four CPU cores and a single accelerator as priority task source. In the chart 502, time per iteration equaling 0.1 seconds per number of iterations per work item is represented on the horizontal axis and static partitioner time divided by dynamic partitioner time is represented on the vertical axis. Further, the "A" bars indicate acceleration on par with 1 CPU core, the "B" bars indicate acceleration 2× faster than 1 CPU core, the "C" bars indicate acceleration 4× faster than 1 CPU core, the "D" bars indicate acceleration 10× faster than 1 CPU core, and the "E" bars indicate acceleration 100× faster than 1 CPU core. Embodiments are not limited in this context.

To demonstrate the potential impact of embodiments of one or more of the disclosed techniques, a microbenchmark that simulates offload to an accelerator was implemented. The pseudocode of the benchmark is provided below:

```
// accelerator
while (fetch_and_decrement(number_of_items) > 1) {
    for (int i = 0; 1 < num_iterations_per_item; ++i) {
        Spin for α * T_iteration
    }
    spawn high-priority hand-shake task into runtime with P
        threads
    wait for response
}
// host
while (fetch_and_decrement(number_of_items) > 1) {
    // will execute in runtime with four threads available
    parallel_for(0, num_iterations_per_item,
        [ ](int i) {
            spin for T_iteration
        },
        PARTITIONER_UNDER_TEST( )
    );
}
```

In the microbenchmark, there is an atomic counter that keeps track of a number_of_items to be processed. An accelerator and host share this counter and each compete to execute work items. Work items execute num_i terations_per_item iterations that each take $T_{iteration}$ time to execute on a host CPU and $\alpha*T_{iteration}$ to execute on the accelerator, where a represents an acceleration factor. For instance, an acceleration factor of 0.1 indicates that the accelerator processes an item 10× faster than a CPU core.

The accelerator in the pseudocode executes a while-loop, atomically decrementing the number_of_items counter using a fetch_and_decrement in each iteration. If the fetched value is greater than 1, the accelerator "processes an item". The processing is simulated by a loop that executes num_iterations_per_item iterations, spinning for $\alpha*T_{iteration}$ in each iteration. After processing the item, the accelerator injects a high-priority task for the host. Only after the host has executed the high-priority task, can the accelerator obtain a new item to execute. This behavior attempts to mimic a hybrid application that is spreading work between the CPU and accelerator but must coordinate the work.

The host in the pseudocode also executes a while-loop. When it obtains a work item, it "processes" the work item by executing a TBB parallel_for loop across the item's range. In the performed test, four total host threads are used, the main host thread plus three worker threads. The results collected for the microbenchmark using work items that contain 1 second of CPU work, so $T_{item}=1$ second. The total wall-clock time if executed on a single CPU core would therefore be $T_{total}$=number_of_items*$T_{item}$ and $T_{item}$=num_iterations_per_item*$T_{iteration}$.

For comparison, num_iterations_per_item was varied and the execution time of the microbenchmark was measured when using a tbb::static_partitioner (N/P iterations per chunk, which is optimal for this well-balanced workload when only using the host). The static partitioner limits the splitting of the work. Thus, the number of subranges may be limited by the number of CPU threads involved and the worker threads will not be able to react to the high-priority hand-shake task until one of them finishes the large chunk of CPU work they were assigned. Accordingly, the chart 502 shows the improvement for the microbenchmark when using the disclosed techniques instead of a loop-optimal static partitioner.

In the chart 502, when there are only a few iterations per work item (i.e., toward the left in the chart 502), the time per iteration remains high and N/P approximately equals 1, indicating modest improvement. When the number of iterations per work item is very high (i.e., towards the right of the chart 502), the time for a single iteration is very low and scheduling overheads begin to dominate when the chunk size is set to one, indicating modest improvement. However, when N/P>>1 and scheduling overheads for tasks with a chunk size of one is reasonable (i.e., in the middle of chart 502), performance is improved significantly. When the accelerator is 10× or 100× faster than a single CPU core, offload to the accelerator can be important for getting good performance and the techniques disclosed herein can enable the host to react to the hand-shake tasks from the accelerator and to continue to feed it more work. Absent the techniques disclosed herein, the host may only react to the accelerator after it has completed its own work, delaying the next offload to the accelerator.

Figure 6:
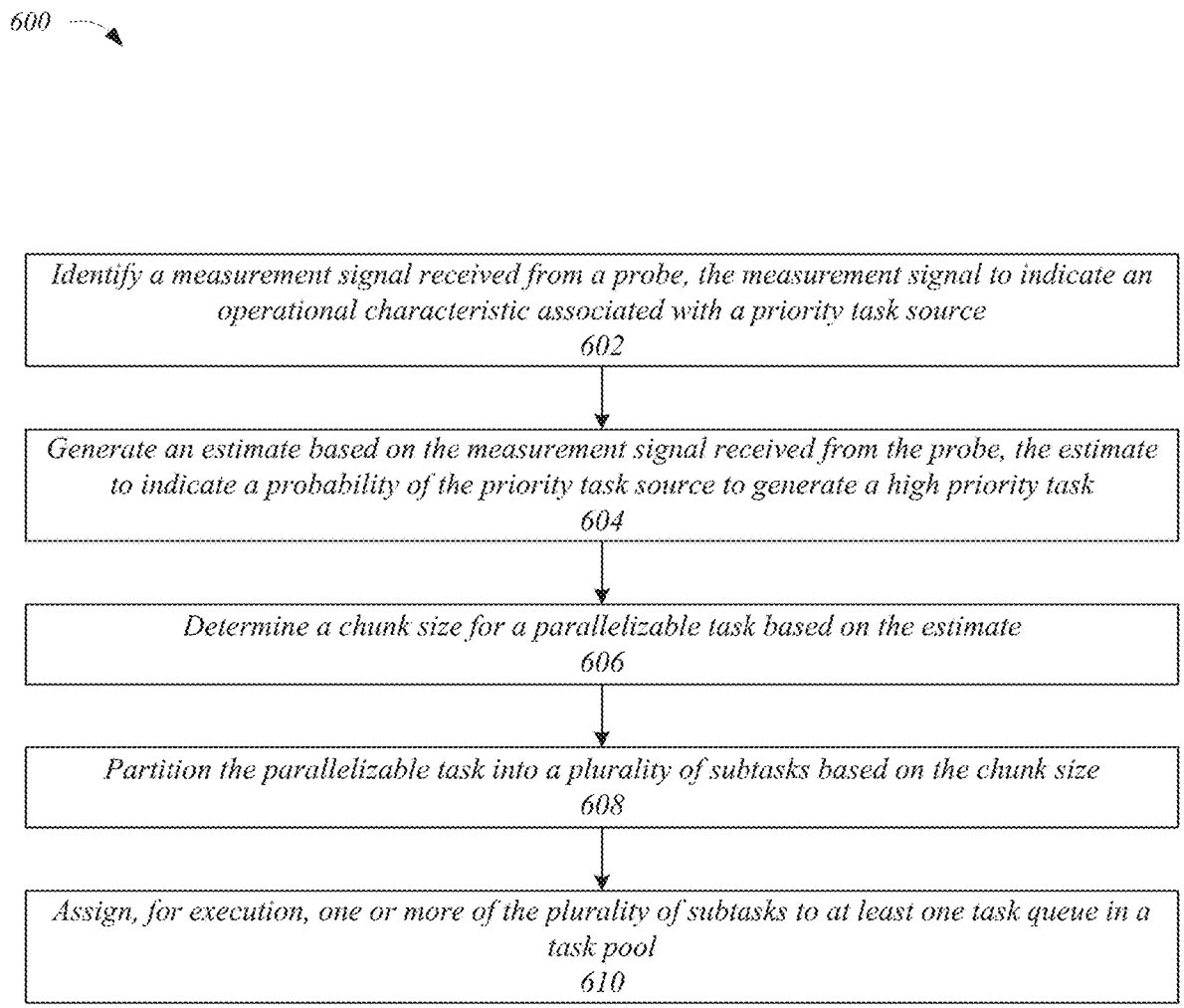
FIG. 6 illustrates an embodiment of a logic flow according to one or more embodiments described herein.

FIG. 6 illustrates one embodiment of a logic flow 600, which may be representative of operations that may be executed in various embodiments in conjunction with techniques to assess the probability of high-priority tasks being created and/or dynamically partition tasks for parallel processing based on the probability of high-priority tasks being created. The logic flow 600 may be representative of some or all of the operations that may be executed by one or more components/devices/environments described herein, such as estimation manager 106 and/or one or more of dynamic range partitioners 114-A, 114-B, 114-Z. The embodiments are not limited in this context.

In the illustrated embodiments, logic flow 600 may begin at block 602. At block 602 "identify a measurement signal received from a probe, the measurement signal to indicate an operational characteristic associated with a priority task source" a measurement signal indicating an operational characteristic associated with a priority task source may be identified. For example, estimation manager 106 may identify measurement signal 230 received from probe 104-1. In such examples, the measurement signal 230 may indicate an operational characteristic associated with priority task source 102. Proceeding to block 604 "generate an estimate based on the measurement signal received from the probe, the estimate to indicate a probability of the priority task source to generate a high-priority task" an estimate that indicates a probability of the priority task source generating a high-priority task may be generated based on the measurement signal. For instance, estimator 234 may utilize one or more of probability function 242, probe settings 236, estimation settings 238, and historical data 240 to generate estimate 232 based on measurement signal 230.

Continuing to block 606 "determine a chunk size for a parallelizable task based on the estimate" a chunk size for a parallelizable task may be determined based on the estimate. For example, chunk manager 246 may determine chunk size 244 for task 112-A based on estimate 232. In some such examples, chunk manager 246 may determine chunk size 244 for task 112-A based on estimate 232 and one or more of estimate threshold 248, thread count 250, iteration count 252, and partitioner settings 254. At block 608 "partition the parallelizable task into a plurality of subtasks based on the chunk size" the parallelizable task may be partitioned into a plurality of subtasks based on the chunk size. For instance, dynamic range partitioner 114-A may partition task 112-A into a plurality of subtasks based on chunk size 244. Proceeding to block 610 "assign, for execution, one or more of the plurality of subtasks to at least one task queue in a task pool" one or more of the plurality of subtasks may be assigned to at least one task queue in a task pool for execution. For example, task scheduler 110 may assign one or more of a plurality of subtasks generated by dynamic partitioner 114-B based on task 112-B to task queue 118-2 of task pool 116. In such examples, the one or more of the plurality of subtasks may be assigned to task queue 118-2 for execution by worker thread 112-2 of thread pool 120.

FIG. 7 illustrates an embodiment of a storage medium 700. Storage medium 700 may comprise any non-transitory computer-readable storage medium or machine-readable storage medium, such as an optical, magnetic or semiconductor storage medium. In various embodiments, storage medium 700 may comprise an article of manufacture. In some embodiments, storage medium 700 may store computer-executable instructions, such as computer-executable instructions to implement one or more of logic flows or operations described herein, such as with respect to logic flow 600 of FIG. 6. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 8:
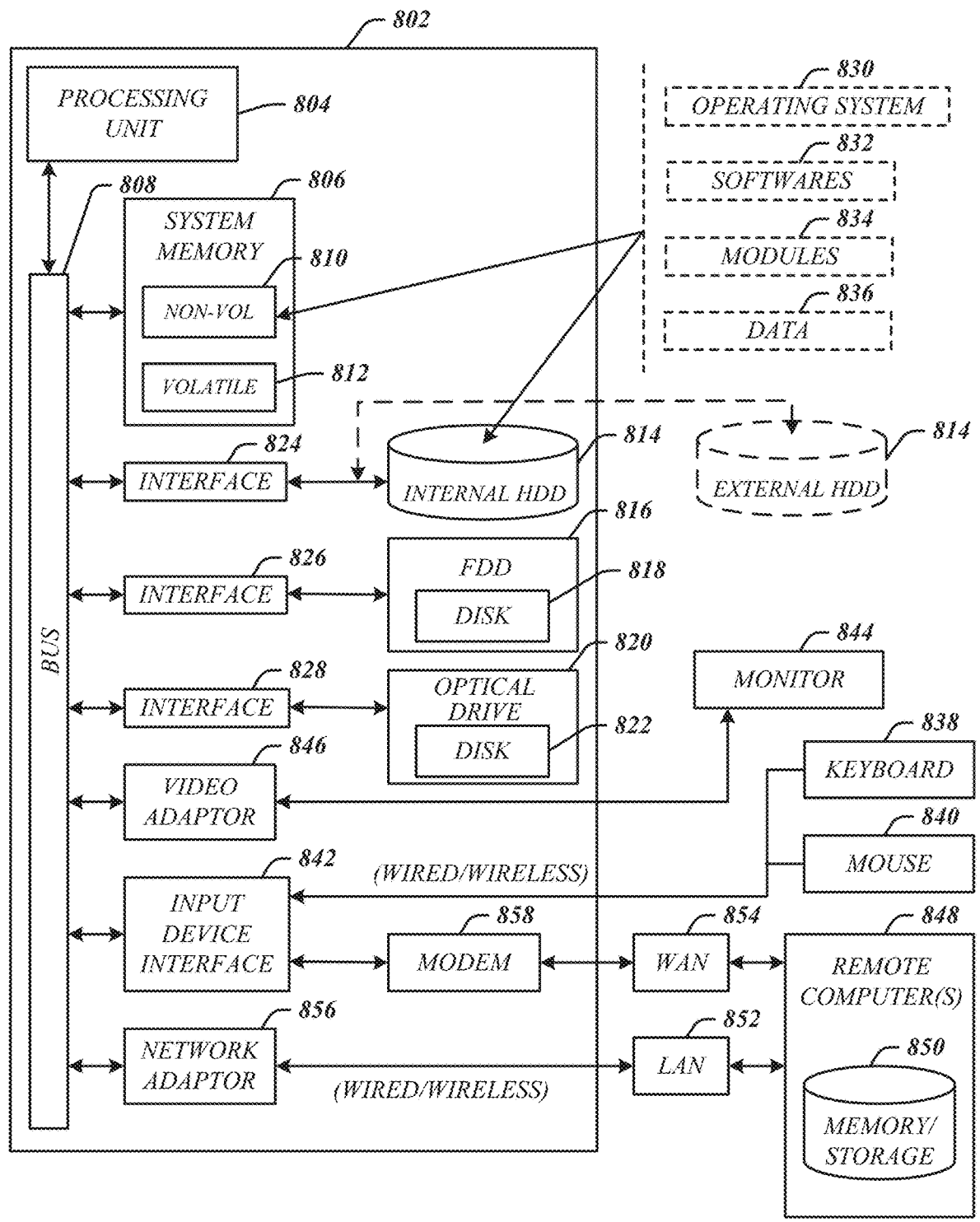
FIG. 8 illustrates an embodiment of a computing architecture according to one or more embodiments described herein.

FIG. 8 illustrates an embodiment of an exemplary computing architecture 800 that may be suitable for implementing various embodiments as previously described. In various embodiments, the computing architecture 800 may comprise or be implemented as part of an electronic device. In some embodiments, the computing architecture 800 may be representative, for example, of one or more component described herein. In some embodiments, computing architecture 800 may be representative, for example, of a computing device that implements or utilizes one or more portions of estimation manager 106, dynamic partitioner 114-A, 114-B, 114-Z, and/or one or more techniques described herein. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 comprises a processing unit 804, a system memory 806 and a system bus 808. The processing unit 804 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 804.

The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. In some embodiments, system memory 806 may include main memory. A basic input/output system (BIOS) can be stored in the non-volatile memory 810.

The computer 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by an HDD interface 824, an FDD interface 826 and an optical drive interface 828, respectively. The HDD interface 824 for external drive implementations can include at least one or both of Universal Serial Bus (USB) and Institute of Electrical and Electronics Engineers (IEEE) 994 interface technologies. In various embodiments, these types of memory may not be included in main memory or system memory.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include or implement, for example, the various techniques, applications, and/or components described herein.

A user can enter commands and information into the computer 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 804 through an input device interface 842 that is coupled to the system bus 808 but can be connected by other interfaces such as a parallel port, IEEE 994 serial port, a game port, a USB port, an IR interface, and so forth.

A monitor 844 or other type of display device is also connected to the system bus 808 via an interface, such as a video adaptor 846. The monitor 844 may be internal or external to the computer 802. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer 848. In various embodiments, one or more interactions described herein may occur via the networked environment. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 858, or is connected to a communications server on the WAN 854 or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 9:
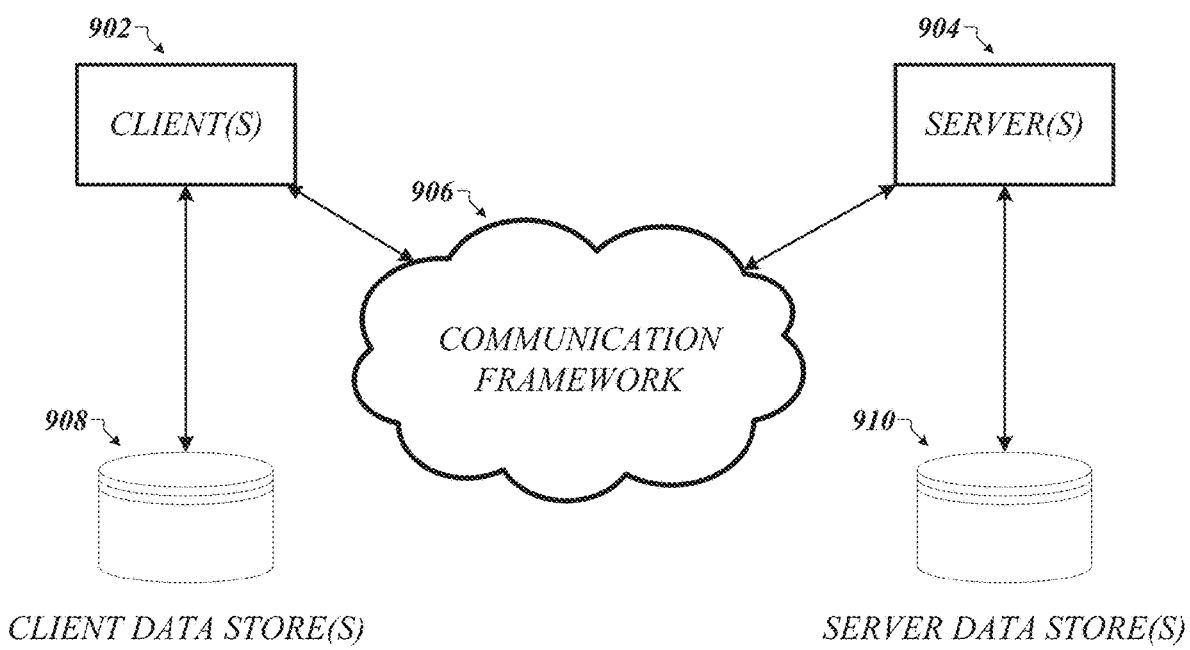
FIG. 9 illustrates an embodiment of a communications architecture according to one or more embodiments described herein.

FIG. 9 illustrates a block diagram of an exemplary communications architecture 900 that may be suitable for implementing various embodiments as previously described. The communications architecture 900 includes various common communications elements, such as a transmitter, receiver, transceiver, radio, network interface, baseband processor, antenna, amplifiers, filters, power supplies, and so forth. The embodiments, however, are not limited to implementation by the communications architecture 900.

As shown in FIG. 9, the communications architecture 900 comprises includes one or more clients 902 and servers 904. In some embodiments, communications architecture may include or implement one or more portions of components, applications, and/or techniques described herein. The clients 902 and the servers 904 are operatively connected to one or more respective client data stores 908 and server data stores 910 that can be employed to store information local to the respective clients 902 and servers 904, such as cookies and/or associated contextual information. In various embodiments, any one of servers 904 may implement one or more of logic flows or operations described herein, and storage medium 700 of FIG. 7 in conjunction with storage of data received from any one of clients 902 on any of server data stores 910. In one or more embodiments, one or more of client data store(s) 908 or server data store(s) 910 may include memory accessible to one or more portions of components, applications, and/or techniques described herein.

The clients 902 and the servers 904 may communicate information between each other using a communication framework 906. The communications framework 906 may implement any well-known communications techniques and protocols. The communications framework 906 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 906 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1900 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 902 and the servers 904. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments, from which numerous permutations and configurations will be apparent.

Example 1 is an apparatus, the apparatus comprising: a processor; and memory comprising instructions that when executed by the processor cause the processor to: identify a measurement signal received from a probe, the measurement signal to indicate an operational characteristic associated with a priority task source; generate an estimate based on the measurement signal received from the probe, the estimate to indicate a probability of the priority task source to generate a high-priority task; determine a chunk size for a parallelizable task based on the estimate; partition the parallelizable task into a plurality of subtasks based on the chunk size; and assign, for execution, one or more of the plurality of subtasks to at least one task queue in a task pool.

Example 2 includes the subject matter of Example 1, the memory comprising instructions that when executed by the processor cause the processor to determine a first chunk size when the estimate indicates a high probability of high-priority task generation and determine a second chunk size when the estimate indicates a low probability of high-priority task generation, wherein the first chunk size is smaller than the second chunk size.

Example 3 includes the subject matter of Example 1, the memory comprising instructions that when executed by the processor cause the processor to generate the estimate based on the measurement signal, historical measurement data, and a probability function.

Example 4 includes the subject matter of Example 1, the memory comprising instructions that when executed by the processor cause the processor to determine the chunk size based on the estimate, a thread count, and an iteration count.

Example 5 includes the subject matter of Example 1, wherein the parallelizable task comprises a parallel loop or a divide and conquer algorithm task.

Example 6 includes the subject matter of Example 1, the operational characteristic associated with the priority task source and indicated by the measurement signal comprising a device state.

Example 7 includes the subject matter of Example 6, the device state comprising one or more of a power consumption, a power state, an idle state, a temperature, and a frequency.

Example 8 includes the subject matter of Example 1, the operational characteristic associated with the priority task source and indicated by the measurement signal comprising a software state.

Example 9 includes the subject matter of Example 8, the software state comprising one or more of a queue state in a driver for the priority task source, an indication that results are pending from a computation that has been offloaded to the priority task source, a flag, a state bit, and a register value.

Example 10 includes the subject matter of Example 1, the priority task source comprising a hardware accelerator.

Example 11 includes the subject matter of Example 10, the hardware accelerator comprising one or more of a graphic processing unit (GPU), a field programmable gate array (FPGA), a machine learning accelerator, and an encryption accelerator.

Example 12 includes the subject matter of Example 1, the memory comprising instructions that when executed by the processor cause the processor to periodically generate the estimate based on the measurement signal.

Example 13 includes the subject matter of Example 1, the memory comprising instructions that when executed by the processor cause the processor to generate the estimate based on the measurement signal in response to a request from a dynamic range partitioner that determines the chunk size.

Example 14 includes the subject matter of Example 1, the probe comprising one or more of a temperature sensor, a voltage sensor, a current sensor, a software component, a computer-readable storage, and a register.

Example 15 includes the subject matter of Example 1, the memory comprising instructions that when executed by the processor cause the processor to: compare the estimate to an estimate threshold; determine a first chunk size for the parallelizable task when the estimate is above the estimate threshold; and determine a second chunk size for the parallelizable task when the estimate is below the estimate threshold, wherein the first chunk size and the second chunk size are different.

Example 16 includes the subject matter of Example 1, wherein each task queue in the task pool is associated with a worker thread in a thread pool and each worker thread in the thread pool is associated with a logical core of the processor.

Example 17 is at least one non-transitory computer-readable medium comprising a set of instructions that, in response to being executed by a processor circuit, cause the processor circuit to: identify a measurement signal received from a probe, the measurement signal to indicate an operational characteristic associated with a priority task source; generate an estimate based on the measurement signal received from the probe, the estimate to indicate a probability of the priority task source to generate a high-priority task; determine a chunk size for a parallelizable task based on the estimate; partition the parallelizable task into a plurality of subtasks based on the chunk size; and assign, for execution, one or more of the plurality of subtasks to at least one task queue in a task pool.

Example 18 includes the subject matter of Example 17, comprising instructions that, in response to being executed by the processor circuit cause the processor circuit to determine a first chunk size when the estimate indicates a high probability of high-priority task generation and determine a second chunk size when the estimate indicates a low probability of high-priority task generation, wherein the first chunk size is smaller than the second chunk size.

Example 19 includes the subject matter of Example 17, comprising instructions that, in response to being executed by the processor circuit cause the processor circuit to generate the estimate based on the measurement signal, historical measurement data, and a probability function.

Example 20 includes the subject matter of Example 17, comprising instructions that, in response to being executed by the processor circuit cause the processor circuit to determine the chunk size based on the estimate, a thread count, and an iteration count.

Example 21 includes the subject matter of Example 17, wherein the parallelizable task comprises a parallel loop or a divide and conquer algorithm task.

Example 22 includes the subject matter of Example 17, the operational characteristic associated with the priority task source and indicated by the measurement signal comprising a device state.

Example 23 includes the subject matter of Example 22, the device state comprising one or more of a power consumption, a power state, an idle state, a temperature, and a frequency.

Example 24 includes the subject matter of Example 17, the operational characteristic associated with the priority task source and indicated by the measurement signal comprising a software state.

Example 25 includes the subject matter of Example 24, the software state comprising one or more of a queue state in a driver for the priority task source, an indication that results are pending from a computation that has been offloaded to the priority task source, a flag, a state bit, and a register value.

Example 26 includes the subject matter of Example 17, the priority task source comprising a hardware accelerator.

Example 27 includes the subject matter of Example 26, the hardware accelerator comprising one or more of a graphic processing unit (GPU), a field programmable gate array (FPGA), a machine learning accelerator, and an encryption accelerator.

Example 28 includes the subject matter of Example 17, comprising instructions that, in response to being executed by the processor circuit cause the processor circuit to periodically generate estimates based on periodic measurement signals.

Example 29 includes the subject matter of Example 17, comprising instructions that, in response to being executed by the processor circuit cause the processor circuit to generate the estimate based on the measurement signal in response to a request from a dynamic range partitioner that determines the chunk size.

Example 30 includes the subject matter of Example 17, the probe comprising one or more of a temperature sensor, a voltage sensor, a current sensor, a software component, a computer-readable storage, and a register.

Example 31 includes the subject matter of Example 17, comprising instructions that, in response to being executed by the processor circuit cause the processor circuit to: compare the estimate to an estimate threshold; determine a first chunk size for the parallelizable task when the estimate is above the estimate threshold; and determine a second chunk size for the parallelizable task when the estimate is below the estimate threshold, wherein the first chunk size and the second chunk size are different.

Example 32 includes the subject matter of Example 17, wherein each task queue in the task pool is associated with a worker thread in a thread pool and each worker thread in the thread pool is associated with a logical core of the processor.

Example 33 is a computer-implemented method comprising: identifying a measurement signal received from a probe, the measurement signal to indicating an operational characteristic associated with a priority task source; generating an estimate based on the measurement signal received from the probe, the estimate to indicate a probability of the priority task source to generate a high-priority task; determining a chunk size for a parallelizable task based on the estimate; partitioning the parallelizable task into a plurality of subtasks based on the chunk size; and assigning, for execution, one or more of the plurality of subtasks to at least one task queue in a task pool.

Example 34 includes the subject matter of Example 33, comprising determining a first chunk size when the estimate indicates a high probability of high-priority task generation and determine a second chunk size when the estimate indicates a low probability of high-priority task generation, wherein the first chunk size is smaller than the second chunk size.

Example 35 includes the subject matter of Example 33, comprising generating the estimate based on the measurement signal, historical measurement data, and a probability function.

Example 36 includes the subject matter of Example 33, comprising determining the chunk size based on the estimate, a thread count, and an iteration count.

Example 37 includes the subject matter of Example 33, wherein the parallelizable task comprises a parallel loop or a divide and conquer algorithm task.

Example 38 includes the subject matter of Example 33, the operational characteristic associated with the priority task source and indicated by the measurement signal comprising a device state.

Example 39 includes the subject matter of Example 38, the device state comprising one or more of a power consumption, a power state, an idle state, a temperature, and a frequency.

Example 40 includes the subject matter of Example 33, the operational characteristic associated with the priority task source and indicated by the measurement signal comprising a software state.

Example 41 includes the subject matter of Example 40, the software state comprising one or more of a queue state in a driver for the priority task source, an indication that results are pending from a computation that has been offloaded to the priority task source, a flag, a state bit, and a register value.

Example 42 includes the subject matter of Example 33, the priority task source comprising a hardware accelerator.

Example 43 includes the subject matter of Example 42, the hardware accelerator comprising one or more of a graphic processing unit (GPU), a field programmable gate array (FPGA), a machine learning accelerator, and an encryption accelerator.

Example 44 includes the subject matter of Example 33, comprising periodically generating the estimate based on the measurement signal.

Example 45 includes the subject matter of Example 33, comprising generating the estimate based on the measurement signal in response to a request from a dynamic range partitioner that determines the chunk size.

Example 46 includes the subject matter of Example 33, the probe comprising one or more of a temperature sensor, a voltage sensor, a current sensor, a software component, a computer-readable storage, and a register.

Example 47 includes the subject matter of Example 33 comprising: comparing the estimate to an estimate threshold; determining a first chunk size for the parallelizable task when the estimate meets or exceeds the estimate threshold; and determining a second chunk size for the parallelizable task when the estimate is below the estimate threshold, wherein the first chunk size and the second chunk size are different.

Example 48 includes the subject matter of Example 33, wherein each task queue in the task pool is associated with a worker thread in a thread pool and each worker thread in the thread pool is associated with a logical core of the processor.

Example 49 is an apparatus comprising: means for identifying a measurement signal received from a probe, the measurement signal to indicating an operational characteristic associated with a priority task source; means for generating an estimate based on the measurement signal received from the probe, the estimate to indicate a probability of the priority task source to generate a high-priority task; means for determining a chunk size for a parallelizable task based on the estimate; means for partitioning the parallelizable task into a plurality of subtasks based on the chunk size; and means for assigning, for execution, one or more of the plurality of subtasks to at least one task queue in a task pool.

Example 50 includes the subject matter of Example 49, comprising means for determining a first chunk size when the estimate indicates a high probability of high-priority task generation and determine a second chunk size when the estimate indicates a low probability of high-priority task generation, wherein the first chunk size is smaller than the second chunk size.

Example 51 includes the subject matter of Example 49, comprising means for generating the estimate based on the measurement signal, historical measurement data, and a probability function.

Example 52 includes the subject matter of Example 49, comprising means for determining the chunk size based on the estimate, a thread count, and an iteration count.

Example 53 includes the subject matter of Example 49, wherein the parallelizable task comprises a parallel loop or a divide and conquer algorithm task.

Example 54 includes the subject matter of Example 49, the operational characteristic associated with the priority task source and indicated by the measurement signal comprising a device state.

Example 55 includes the subject matter of Example 54, the device state comprising one or more of a power consumption, a power state, an idle state, a temperature, and a frequency.

Example 56 includes the subject matter of Example 49, the operational characteristic associated with the priority task source and indicated by the measurement signal comprising a software state.

Example 57 includes the subject matter of Example 56, the software state comprising one or more of a queue state in a driver for the priority task source, an indication that results are pending from a computation that has been offloaded to the priority task source, a flag, a state bit, and a register value.

Example 58 includes the subject matter of Example 49, the priority task source comprising a hardware accelerator.

Example 59 includes the subject matter of Example 58, the hardware accelerator comprising one or more of a graphic processing unit (GPU), a field programmable gate array (FPGA), a machine learning accelerator, and an encryption accelerator.

Example 60 includes the subject matter of Example 49, comprising means for periodically generating the estimate based on the measurement signal.

Example 61 includes the subject matter of Example 49, comprising means for generating the estimate based on the measurement signal in response to a request from a dynamic range partitioner that determines the chunk size.

Example 62 includes the subject matter of Example 49, the probe comprising one or more of a temperature sensor, a voltage sensor, a current sensor, a software component, a computer-readable storage, and a register.

Example 63 includes the subject matter of Example 49, comprising: means for comparing the estimate to an estimate threshold; means for determining a first chunk size for the parallelizable task when the estimate exceeds the estimate threshold; and means for determining a second chunk size for the parallelizable task when the estimate is below the estimate threshold, wherein the first chunk size and the second chunk size are different.

Example 64 includes the subject matter of Example 49, wherein each task queue in the task pool is associated with a worker thread in a thread pool and each worker thread in the thread pool is associated with a logical core of the processor.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner and may generally include any set of one or more limitations as various disclosed or otherwise demonstrated herein.

The invention claimed is:

1. An apparatus, the apparatus comprising:
a processor; and
memory comprising instructions that when executed by the processor cause the processor to:
identify a measurement signal received from a probe, the measurement signal to indicate an operational characteristic associated with a priority task source, the operational characteristic associated with the priority task source and indicated by the measurement signal comprising a software state, wherein the software state comprises a queue state in a driver for the priority task source, an indication that results are pending from a computation that has been offloaded to the priority task source, a flag, a state bit, or a register value;
generate an estimate based on the measurement signal received from the probe, the estimate to indicate a probability of the priority task source to generate a high-priority task;
determine a chunk size for a parallelizable task based on the estimate;
partition the parallelizable task into a plurality of subtasks based on the chunk size; and
assign, for execution, one or more of the plurality of subtasks to at least one task queue in a task pool.

2. The apparatus of claim 1, the memory comprising instructions that when executed by the processor cause the processor to determine a first chunk size when the estimate indicates a high probability of high-priority task generation and determine a second chunk size when the estimate indicates a low probability of high-priority task generation, wherein the first chunk size is smaller than the second chunk size.

3. The apparatus of claim 1, the memory comprising instructions that when executed by the processor cause the processor to generate the estimate based on the measurement signal, historical measurement data, and a probability function.

4. The apparatus of claim 1, the memory comprising instructions that when executed by the processor cause the processor to determine the chunk size based on the estimate, a thread count, and an iteration count.

5. The apparatus of claim 1, wherein the parallelizable task comprises a parallel loop or a divide and conquer algorithm task.

6. The apparatus of claim 1, the operational characteristic associated with the priority task source and indicated by the measurement signal comprising a device state, wherein the device state comprises one or more of a power consumption, a power state, an idle state, a temperature, or a frequency.

7. The apparatus of claim 1, the priority task source comprising one or more of a graphic processing unit (GPU), a field programmable gate array (FPGA), a machine learning accelerator, and an encryption accelerator.

8. The apparatus of claim 1, the probe comprising one or more of a temperature sensor, a voltage sensor, a current sensor, a software component, a computer-readable storage, and a register.

9. The apparatus of claim 1, the memory comprising instructions that when executed by the processor cause the processor to:
compare the estimate to an estimate threshold;
determine a first chunk size for the parallelizable task when the estimate meets or exceeds the estimate threshold; and
determine a second chunk size for the parallelizable task when the estimate is below the estimate threshold, wherein the first chunk size and the second chunk size are different.

10. At least one non-transitory computer-readable medium comprising a set of instructions that, in response to being executed by a processor circuit, cause the processor circuit to:
identify a measurement signal received from a probe, the measurement signal to indicate an operational characteristic associated with a priority task source, the operational characteristic associated with the priority task source and indicated by the measurement signal comprising a software state, wherein the software state comprises a queue state in a driver for the priority task source, an indication that results are pending from a computation that has been offloaded to the priority task source, a flag, a state bit, or a register value;
generate an estimate based on the measurement signal received from the probe, the estimate to indicate a probability of the priority task source to generate a high-priority task;
determine a chunk size for a parallelizable task based on the estimate;
partition the parallelizable task into a plurality of subtasks based on the chunk size; and
assign, for execution, one or more of the plurality of subtasks to at least one task queue in a task pool.

11. The at least one non-transitory computer-readable medium of claim 10, comprising instructions that, in response to being executed by the processor circuit cause the processor circuit to determine a first chunk size when the estimate indicates a high probability of high-priority task generation and determine a second chunk size when the estimate indicates a low probability of high-priority task generation, wherein the first chunk size is smaller than the second chunk size.

12. The at least one non-transitory computer-readable medium of claim 10, comprising instructions that, in response to being executed by the processor circuit cause the processor circuit to generate the estimate based on the measurement signal, historical measurement data, and a probability function.

13. The at least one non-transitory computer-readable medium of claim 10, comprising instructions that, in response to being executed by the processor circuit cause the processor circuit to determine the chunk size based on the estimate, a thread count, and an iteration count.

14. The at least one non-transitory computer-readable medium of claim 10, wherein the parallelizable task comprises a parallel loop or a divide and conquer algorithm task.

15. The at least one non-transitory computer-readable medium of claim 10, the operational characteristic associated with the priority task source and indicated by the measurement signal comprising a device state.

16. A computer-implemented method comprising:
identifying a measurement signal received from a probe, the measurement signal to indicating an operational characteristic associated with a priority task source, the operational characteristic associated with the priority task source and indicated by the measurement signal comprising a software state, wherein the software state comprises a queue state in a driver for the priority task source, an indication that results are pending from a computation that has been offloaded to the priority task source, a flag, a state bit, or a register value;
generating an estimate based on the measurement signal received from the probe, the estimate to indicate a probability of the priority task source to generate a high-priority task;
determining a chunk size for a parallelizable task based on the estimate;
partitioning the parallelizable task into a plurality of subtasks based on the chunk size; and
assigning, for execution, one or more of the plurality of subtasks to at least one task queue in a task pool.

17. The computer-implemented method of claim 16, comprising determining a first chunk size when the estimate indicates a high probability of high-priority task generation and determine a second chunk size when the estimate indicates a low probability of high-priority task generation, wherein the first chunk size is smaller than the second chunk size.

18. The computer-implemented method of claim 16, comprising generating the estimate based on the measurement signal, historical measurement data, and a probability function.

19. The computer-implemented method of claim 16, comprising determining the chunk size based on the estimate, a thread count, and an iteration count.

* * * * *